Feb. 10, 1970  D. E. WIEGAND  3,494,992
METHOD OF PRODUCING A MAT FROM AN AIR
SUSPENSION OF FIBERS AND LIQUID
Filed Feb. 1, 1968

INVENTOR.
DONALD E. WIEGAND
BY
HIS ATTORNEY

United States Patent Office 3,494,992
Patented Feb. 10, 1970

3,494,992
METHOD OF PRODUCING A MAT FROM AN AIR SUSPENSION OF FIBERS AND LIQUID
Donald E. Wiegand, Minneapolis, Minn., assignor to Conwed Corporation, St. Paul, Minn., a corporation of Delaware
Filed Feb. 1, 1968, Ser. No. 702,365
Int. Cl. D04h 1/08, 17/00
U.S. Cl. 264—121                              2 Claims

ABSTRACT OF THE DISCLOSURE

An air-fiber stream forms a vena contracta beyond the point of discharge and is mixed with binder carrying liquid sprayed outwardly in a flaring spray from within the air-fiber stream at about the point of the vena contracta.

---

The present invention relates generally to combining spray particles of liquid adhesive with fibers suspended in air, and in particular to depositing the resulting fibers as a felted mat.

Heretofore, liquid adhesive has been sprayed into a mass of falling air-suspended fibers, for example, by projecting a stream of air containing fibers into a region for deposition, and from a lateral nearby source discharging a spray of liquid adhesive into said region, as a result, some fibers receive no liquid, others receive too much liquid, and some spray particles fail to reach falling fibers and deposit elsewhere, as on walls of a chamber confining the region, where the adhesive gathers strap fibers and forms undesirable festoons.

In my copending application U.S. Ser. No. 702,363 filed Feb. 1, 1968, I disclose one means of improving the mixing of an air-fiber stream with a binder carrying liquid spray while decreasing clotting or "festooning" by causing a contracting of the air-fiber stream at the point where the flaring liquid spray is created and by confining the air-fiber stream in an air-curtain. The instant invention further enhances such mixing and eliminates any possibility of "festooning" by causting such intermixing outside of the conduit orifice within a vena contracta as hereinafter described.

According to the present invention, the liquid spray particles are formed by use of high pressure gas, so that a spray of such gas containing liquid particles resultingly flares from the discharge orifice. Also, the said orifice is located within the confines of a stream of air carrying fibers to be wetted by the flaring spray. The liquid spray flares into the fiber stream where the fiber stream is necking down, forming a vena contracta. Such an arrangement may be carried out by interposing spray nozzle means within the confines of the path of the fiber stream in or adjacent to the region of said vena contracta.

It is the general object of the invention to provide and locate nozzle means so that clotting of fibers is avoided while enhancing intermixing of the liquid particles of the liquid spray with the fibers of the fiber stream.

It is a particular object of the invention to provide a suitable orifice at the outlet of the conduit for the fiber stream so as to provide in the fiber stream a vena contracta shortly beyond the conduit orifice; and to locate the spray orifice within the fiber stream and in the vicinity of the vena contracta, and preferably slightly upstream of the vena contracta.

In a vena contracta the fibers move with increased velocity as they approach and form the vena contracta. At about this point, the liquid spray is introduced and flares outwardly into the contracting fiber stream, thus causing excellent and uniform mixing of fibers and spray particles with deposition of the spray particles on the fibers. Then as the fiber stream flares the spray stream continues to flare into it, with the fiber stream forming an air-curtain or envlope to minimize escape of spray particles from the stream. In achieving these results, all the variables of the process are adjusted empirically; such factors include the concentration of fibers in the carrying air stream, the velocity of discharge of the air stream, the area of the fiber orifice, the proportions of air and liquid in the spray discharge, the pressure of air in the spray nozzle, and the quantity of fiber being discharged.

In general, it is also the object to deposit fibers wet with binder carrying liquid to form a felt on a foraminous member over a vacuum box to draw the suspending air through the foramens, preferably using a moving conveyer screen on which continuously to build a mat.

A further object is to provide suitable tapering of the spray nozzle to minimize the hanging up of fibers with subsequent clots and uneven mat formation.

The invention and the apparatus, therefore, are illustrated in the accompanying drawings in which.

Figure 2:
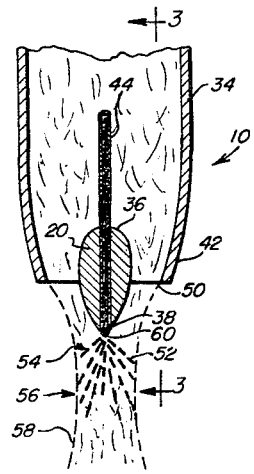
FIG. 2 is a cross-section of a simple cylindrical felting head taken on line 2—2 of FIG. 3, showing one type of felting head outlet and nozzle therefor.
Figures 3, 4:
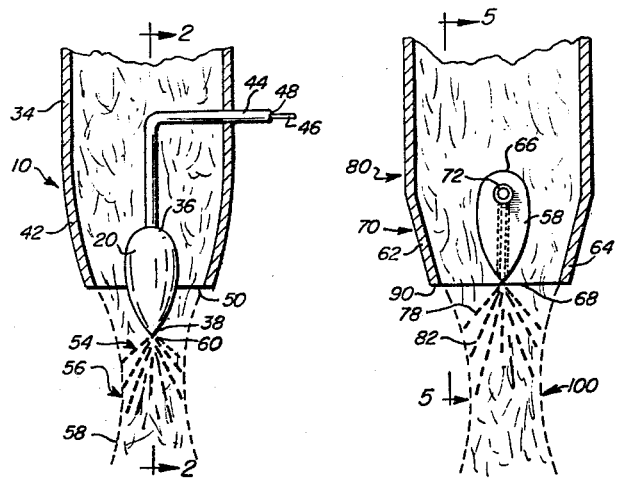
FIG. 3 is a view taken on line 3—3 of FIG. 2.
Figure 5:
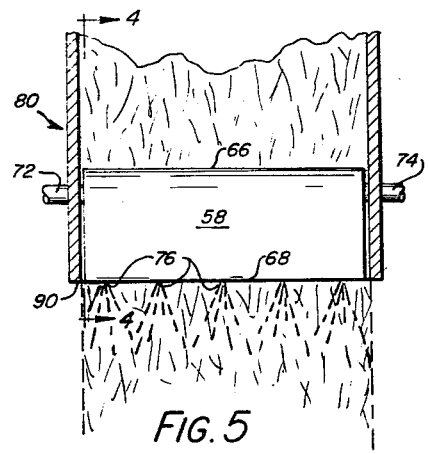

FIGS. 4 and 5 are views similar to FIGS. 2 and 3, taken respectively on lines 4—4 and 5—5, showing a rectangular felting head.

Figure 6:
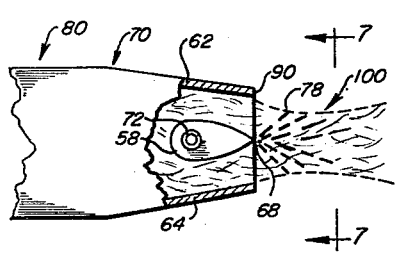

FIG. 6 is a side view of the head of FIGS. 4 and 5 with the side partly broken away.

Figure 7:
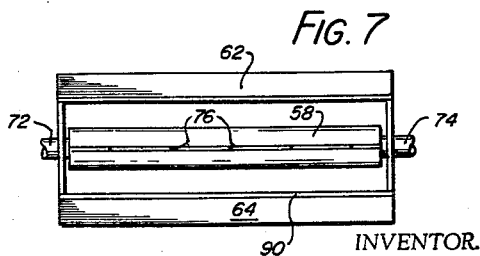

FIG. 7 is a face view of the felting head outlet and nozzle of FIGS. 4, 5, and 6 taken along line 7—7 of FIG. 6.

Figure 1:
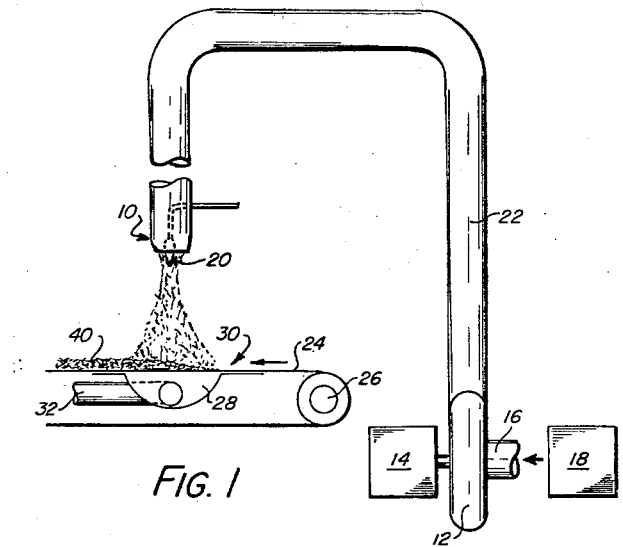
FIG. 1 is a schematic showing of a felting apparatus incorporating the invention.

In FIG. 1, a felting apparatus is shown as including a fan 12 driven by the motor 14 and having an air and fiber inlet conduit 16 for fiber or fibrous material fed to the apparatus from supply 18, for example, in the manner set forth in Patent No. 2,646,381. The air-fiber stream from fan 12 is conveyed through outlet duct 22 to and through the felting head generally indicated at 10, which head includes nozzle 20. The fibrous mat is then formed upon and collected by any suitable means such as indicated generally at 30.

In FIGS. 1, 2, and 3, a felting head 10 is shown as a simple tubular cylindrical conduit 34, which has centered within it an air-dividing tapered generally tear shaped nozzle 20, with a dividing end 36 just within the orifice 50 at the lower end of the generally conically shaped portion 42 of the conduit 34, and a body tapering to a downstream tip 38 just outside the orifice 50. The nozzle has internally a conventional nozzle structure receiving a supply of high-pressure air and a supply of liquid respectively via conduits 44 and 46. The conduit 46 for liquid is arranged concentrically within and spaced from the inside wall of conduit 44. Thus, the air passes through the space 48 between the outside of conduit 46 and the inside of conduit 44 while the liquid to be atomized passes through conduit 46. The tip 38 is relatively small in cross-section and is provided with at least one orifice 60 for discharge of spray particles 52. The spray flares outwardly, as shown generally at 54, almost immediately upon leaving the nozzle. Alternatively, conventional hydraulic spray nozzles may be used which require only a supply of liquid under proper pressure to create satisfactory finely atomized sprays. The flaring of the spray will be essentially the same with the same mixing with the air-fiber stream.

In the felting head 10 there is a stream of air carrying suspended fibers, which stream, on leaving the orifice 50, first contracts slightly to form a vena contracta zone 56 due to the direction given to it by the conically shaped portion 42, and then flares as indicated at 58. The dividing end 36 of the nozzle smoothly divides the fiber stream and leads it smoothly along the surface of the nozzle, thus minimizing or avoiding turbulence in the stream leaving orifice 50. This reduction or elimination of turbulence prevents an obstructive effect such as would result in eddy currents from a nozzle not so tapered to the orifice.

The tapered or conically shaped portion 42 terminating in orifice 50 will produce a pronounced vena contracta 56 in the fiber stream. By means of the vena contracta 56 thus created, the velocity of the air-fiber stream is increased to a maximum and its direction is controlled to impinge more effectively inwardly toward the outwardly flaring stream 54 of liquid spray. Thus, greatly improved intermixing of the liquid spray and airfiber stream is achieved while eliminating the possibility of festoon formation in the conduit. From the vena contracta 56 the fiber stream also flares at 58 and the fibers move with decreasing velocity in a flare together with the flaring spray 54.

FIGS. 4 through 7 show a modification of the felting head of FIGS. 1, 2, and 3 in which a rectangular head 80 has a lower end 70 which is tapered inwardly at the two longer sides 62 and 64, forming an orifice 90. This construction causes its fiber stream 82 beyond the orifice 90 to converge to a modified vena contracta zone 100 which contracts only from the two longer sides of the stream. Elongated nozzle 58 lies centrally across the felting head 80 and parallel to the longer sides 62 and 64 of the head 80 with its stream-splitting end 66 within head 80 and its downstream tip 68 substantially in the plane of the orifice 90. Conduits 72 and 74 respectively for air and adhesive-bearing liquid lead into the nozzle at its sides, to discharge spray particles from at least one and preferably a plurality of spray orifices 76. Alternatively, hydraulic spray nozzles which do not require a separate source of air under pressure may be used as indicated above with respect to FIGS. 1, 2, and 3. In FIG. 4, the numeral 78 indicates liquid particles flaring into the contracting fiber stream 82, where the air-fiber stream 82 necks down to form the vena contracta 100.

To collect the fibers conventional means is employed, of which one form is illustrated in FIG. 1 located at a suitable distance from the felting head 10. There is shown an endless conveyer screen 24 running over roll 26 and over a suction box 28 connected by conduit 32 to suction means (not shown). A mat 40 of adhesive-carrying fibers is shown building up on the conveyer 24.

It is to be understood that the arrangement of nozzles and conveyer need not be vertical as shown, and other conventional arrangements may be used. For example, the nozzles may discharge horizontally into a region over a conveyer on which the fibers fall.

In use to form a wide mat, the nozzle structure of FIGS. 1, 2, and 3 may be oscillated to discharge across a wide path which is the width of a moving conveyer thus to build a wide mat from a narrower stream. When such moving nozzle means is not desired, an elongated stationary nozzle means may be employed, such as shown in FIGS. 4, 5, 6, and 7. For most commercial operations, the head 80 of FIGS. 4 through 7 is preferred.

The location of the outlet orifice of the spray nozzle may vary between two extremes. The orifice of the nozzle should not be placed so far outside of the felting head orifice that the flaring liquid spray from the nozzle orifice is too far downstream, since the best mixing is achieved when the liquid spray is flaring outwardly at some point above the narrowest point or vena contracta of the air-fiber stream, thus creating a convergence of the two streams. On the other hand, if the orifice of the nozzle is placed too far upstream within the felting head, the liquid spray from the nozzle orifice will have an opportunity to reach the inside walls of the head, there to form festoons or clumps of fiber and binder which will tend to fall into the mat creating uneven areas. Accordingly, the nozzle orifice should be far enough downstream (though it may actually physically still be within the felting head) that it will be impossible for the spray emerging therefrom to strike the inside of the walls of the head. Conversely, as indicated above, the orifice of the nozzle must be sufficiently upstream with respect to the air-fiber stream that at least a portion of the flaring liquid spray will be expanding at some point above the vena contracta thus providing liquid particles for even the outermost fibers of the air-fiber stream. As shown in the drawings, there is considerable latitude within these two extremes, since the form shown in FIG. 2 has the nozzle orifice outside of the felting head outlet and the form shown in FIGS. 4-7 has the nozzle orifice substantially in the plane of the felting head orifice. Both of these locations are well within the extreme limits mentioned above and do not themselves represent the limits. The particular location and the degree of the vena contracta can be controlled in part by the other factors such as the velocity of the air-fiber stream.

It will be seen that by proper adjustment of the velocities and volumes of the liquid spray with respect to the air-fiber stream, the air-fiber stream will serve to form an envelope or air-curtain to contain the liquid spray within the confines of the air-fiber stream. If the liquid spray is too strong or too large in lateral dimension for the particular air-fiber stream force or lateral dimension, the liquid spray will break through the air-fiber stream and spray fugitive liquid particles outside of the air-fiber stream and downwardly upon the mat being formed. Conversely, if the liquid spray is of inadequate dimension or force with respect to the associated particular air-fiber stream, the liquid spray will not satisfactorily mix with the outermost portions of the air-fiber stream. All of these variables can be readily adjusted for the given fiber concentration, and the liquid being sprayed. In many instances, the spray will consist of a liquid binder for the fibers carried in the air-fiber stream. In other instances, the binder many consist of a dry particulate matter incorporated in the air-fiber stream, which is then activated by the water or other liquid of the liquid spray. In both instances, suitable uniform mixing of the liquid and the fiber is essential. As indicated, this adequate mixing may require adjustments in positioning of the spray orifice and velocities of the spray and air-fiber stream for different fibers and binders as well as the rate of mat formation.

With certain combinations of particulate material and binders it may be desirable to incorporate a dry binder or other additive in the air-fiber stream and utilize the spray for water or other liquid activator for the above referred to dry additive ingredients. Alternatively, the liquid, such as water, may be used solely for its effect on the felting of the product such as the dampening of the web for various purposes, or to provide color, fungicides, fireproofing, and the like.

The mats formed by the method and apparatus disclosed herein (when the binder is suitably set as by drying or heating) are suitable for a number of end uses, including furniture cushioning, furniture padding, packaging, and the like. They may also be used (with subsequent operations such as pressing) to form boards and boardlike materials.

One example of the use of the method and apparatus disclosed herein is the production of suitable upholstery cushioning materials from refined sulphite fibers and a starch solution as a binder for the fibers. The formed mat is then oven dried to form the final bonded product. It has been found that about 6% to 8% starch solids by weight with respect to the weight of fibers in the final mat produces an excellent and uniform blanket, with no appreciable clots coming from festoons and with excellent distribution of binder upon the fibers.

It will be appreciated, that the directions of the liquid spray and the air-fiber stream are not straight line as shown in the drawings and are shown as such for convenience of illustration only. Actually, there will be some curvature to the directions of the spray and the air-fiber stream created by the merging and interrelation of the spray and the stream on each other.

I claim:
1. A method of forming a felted fibrous mat, comprising:
 (a) discharging a stream of air containing suspended fibers from an orifice in a manner to form a vena contracta in the discharged stream beyond said orifice,
 (b) spraying a liquid in a flaring spray into and from within said air-fiber stream at a point adjacent to said vena contracta, whereby said liquid and said fibers are substantially uniformily mixed, and
 (c) collecting said mixed liquid and fibers to form said mat.
2. The method of claim 1 in which the lateral dimension and the force of said air-fiber stream and said spray are adjusted with respect to each other to contain substantially all the liquid spray within the air-fiber stream.

References Cited
UNITED STATES PATENTS 2,646,381    7/1953    Duvall _____ 264—121
2,929,436    3/1960    Hampshire _____ 264—121

ROBERT F. WHITE, Primary Examiner

J. R. HALL, Assistant Examiner